G. H. FRASER.
ROCK CRUSHING OR GRINDING MACHINERY.
APPLICATION FILED JULY 27, 1901. RENEWED JAN. 15, 1917.

1,220,155. Patented Mar. 20, 1917.
10 SHEETS—SHEET 1.

WITNESSES:
Fred White
Thomas T. Wallace

INVENTOR:
George H. Fraser

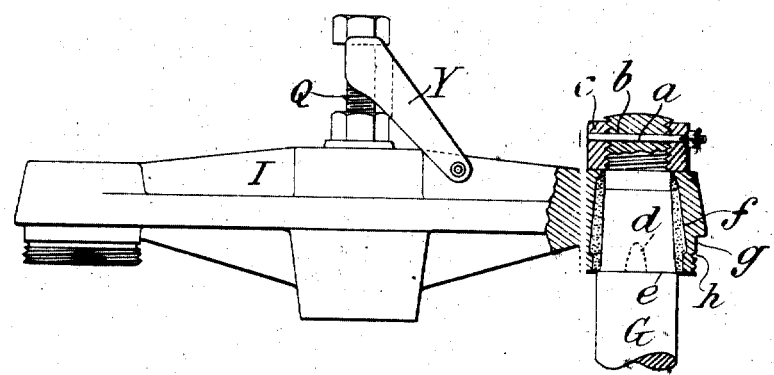
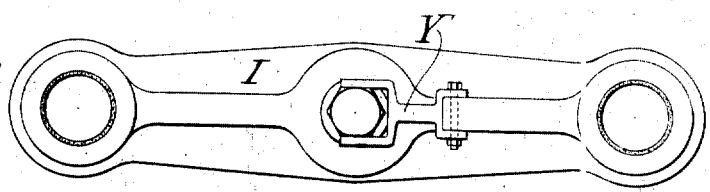
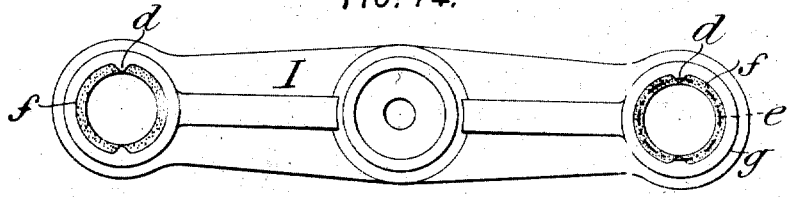
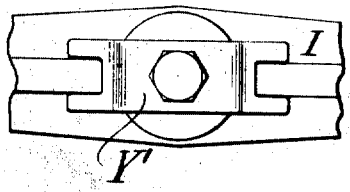
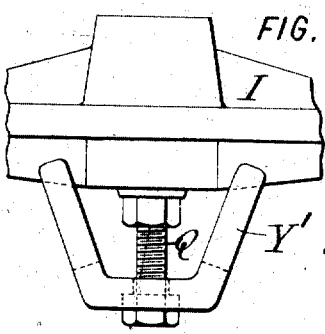

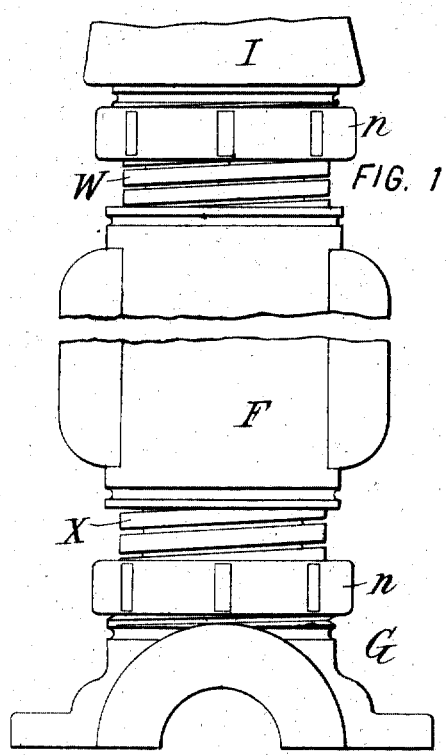
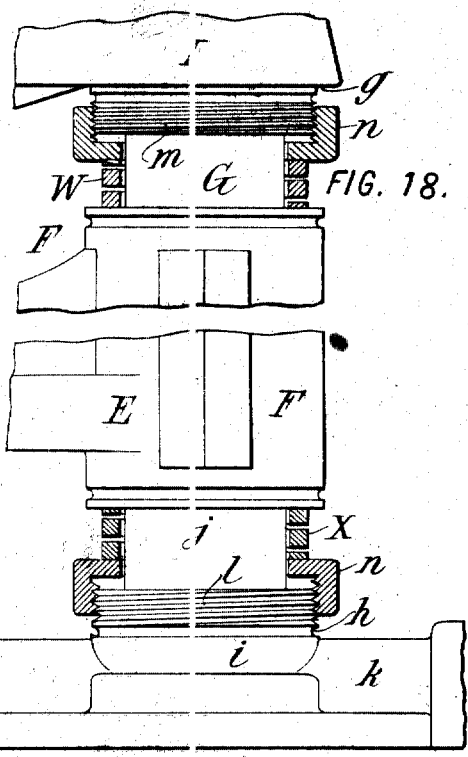
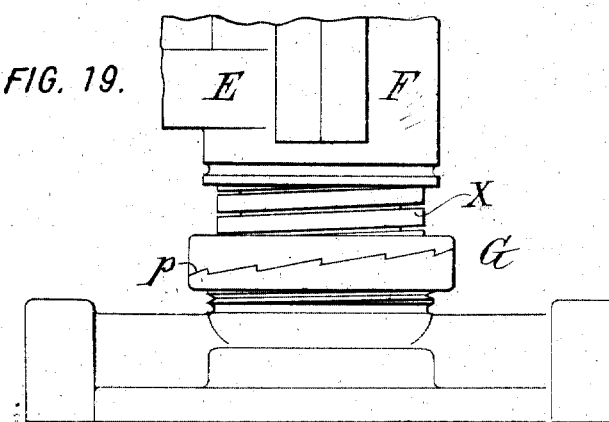

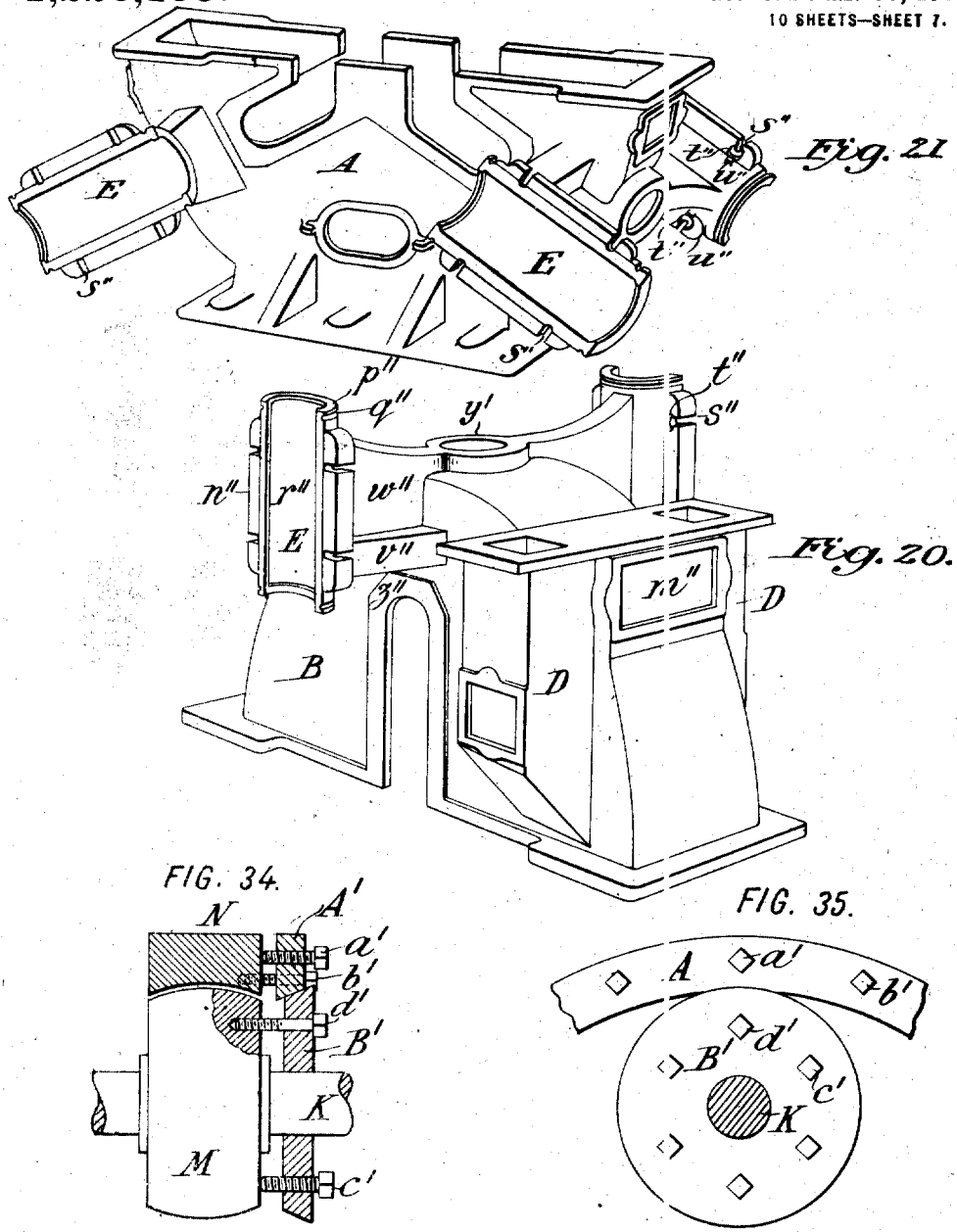

G. H. FRASER.
ROCK CRUSHING OR GRINDING MACHINERY.
APPLICATION FILED JULY 27, 1901. RENEWED JAN. 15, 1917.
1,220,155.
Patented Mar. 20, 1917.
10 SHEETS—SHEET 8.
FIG. 36.
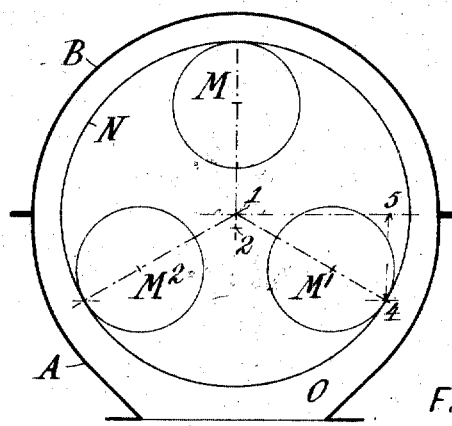
FIG. 37.
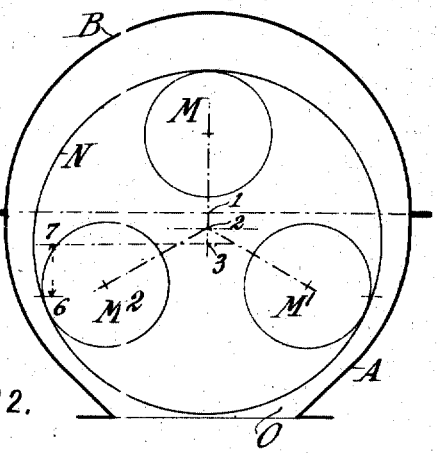
FIG. 22.
FIG. 38.
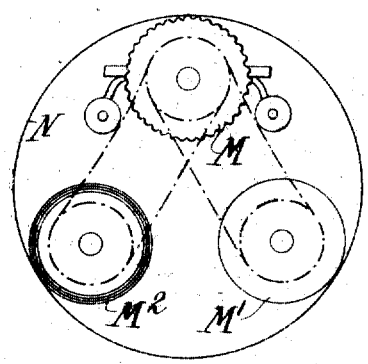
FIG. 39.
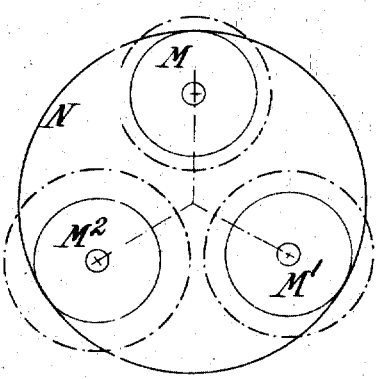
WITNESSES:
Fred White
Thomas F. Wallace
INVENTOR:
George H. Fraser.

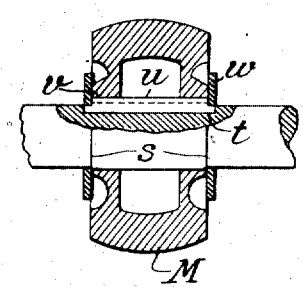
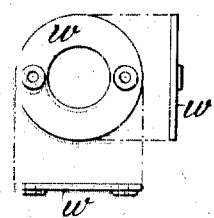
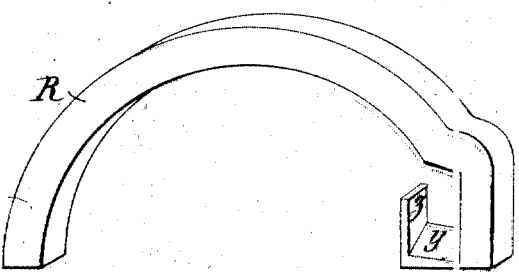
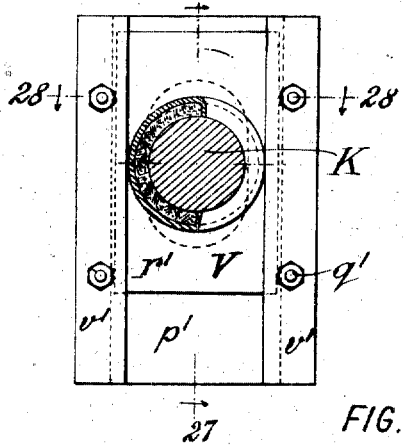
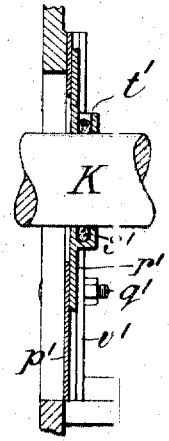
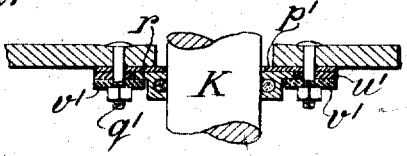

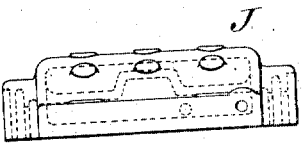
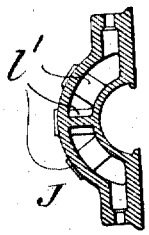
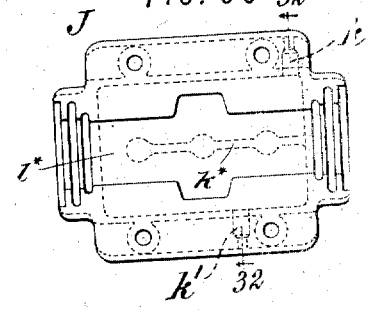
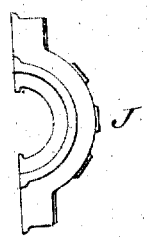
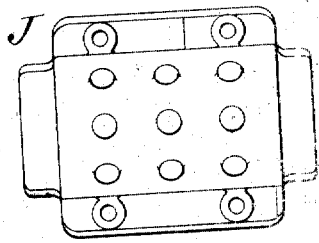

UNITED STATES PATENT OFFICE.

GEORGE H. FRASER, OF BROOKLYN, NEW YORK.

ROCK CRUSHING OR GRINDING MACHINERY.

1,220,155. Specification of Letters Patent. Patented Mar. 20, 1917.

Application filed July 27, 1901, Serial No. 69,886. Renewed January 15, 1917. Serial No. 142,564.

*To all whom it may concern:*

Be it known that I, GEORGE H. FRASER, a citizen of the United States, residing in the borough of Brooklyn, county of Kings, city and State of New York, have invented certain new and useful Improvements in Rock Crushing or Grinding Machinery, of which the following is a specification.

This invention relates to machinery for crushing, granulating, or pulverizing rock, ores, or other materials.

It particularly relates to that class of such machinery in which two revolving parts are used as the crushing members or faces.

Types of such crushers are the Cornish rolls, in which two adjacent rolls crush the material between their faces, and ring and roll pulverizers, in which a roll crushes the material against the inner face of a ring or die. One well known type of the latter class of machine is known as the Kent mill, patented May 7th, 1901, No. 673,856, in which a revolving die is suspended by three internal yieldingly mounted rolls. Certain features of my present invention are particularly available as improvements in this type of mill, although the invention is generally applicable to ore reducing machinery.

My invention aims to provide an improved crusher or pulverizer, both in general principles and in details of construction and arrangement of parts.

To this end in carrying out the preferred form of my present invention, I provide a crusher or pulverizer having an improved shell, an improved disposition of crushing elements, an improved construction of such elements, improved feeding and regulating devices, and the various improvements hereinafter fully set forth and shown in the accompanying drawings, in which—

Fig. 12 is a side view of the top yoke, showing one stem partly in section;

Fig. 13 is a top view of this yoke;

Fig. 14 is an inner face plan thereof;

Fig. 15 is a fragmentary plan of one of the lower yokes;

Fig. 16 is a fragmentary side elevation thereof;

Fig. 17 is an enlarged fragmentary view, showing one of the stems and adjacent parts in side elevation;

Fig. 18 is a similar view looking at right angles and partly in section;

Fig. 19 is a fragmentary view, showing a modification;

Fig. 20 is a perspective view of the top casing alone;

Fig. 21 is a perspective view of the bottom casing alone;

Fig. 22 is a perspective view of the top cheek piece;

Fig. 23 is a sectional view of one of the rolls, and a portion of its shaft;

Fig. 24 is a side and edge view of one of the roll collars;

Fig. 25 is a view of a modification of one of the cheek pieces or rings.

Fig. 26 is a front view of one of the dust guards, showing it and its shaft partly in section;

Fig. 27 is a section thereof on the lines 27—27, looking in the direction of the arrow.

Fig. 28 is a section thereof on the line 28—28, looking in the direction of the arrow;

Fig. 29 is an edge view of one of the caps;

Fig. 30 is an inside plan thereof;

Fig. 31 is an outside plan thereof;

Fig. 32 is a cross section thereof, on the line 32—32 of Fig. 30;

Fig. 33 is an end elevation thereof;

Fig. 34 is a fragmentary sectional view, showing on an enlarged scale the mounting of the track on the ring and the track on the roll, when adjustability of either or both tracks is desired;

Fig. 35 is a fragmentary side view thereof;

Fig. 36 is a diagram showing the position of the ring when concentric to the mounting of the rolls, that is, when the rolls are 120° apart as to the ring;

Fig. 37 shows the position of the rolls when the ring center is dropped to bring it below the eccentric center of the shell, making the rolls contact with the ring at more nearly diametrically opposite points thereof;

Figure 2:
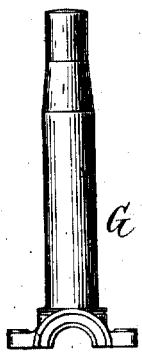
Fig. 2 is a side elevation of one bearing stem.
Figure 1:
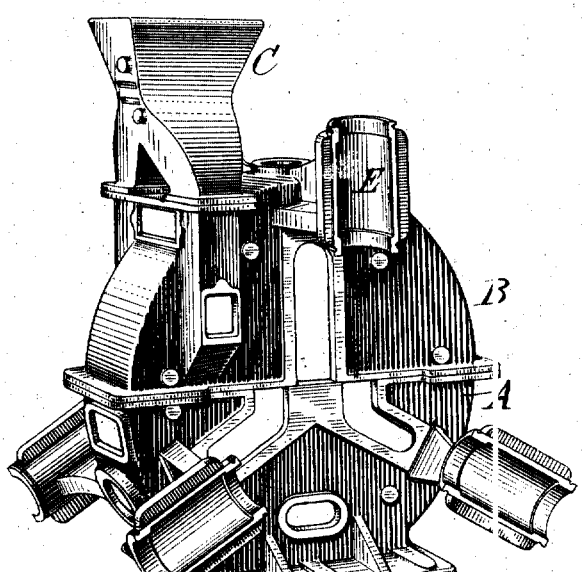
Figure 1 is a perspective view of the top and bottom casings and feed hopper of my machine.
Figure 4:
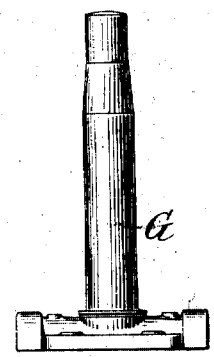
Fig. 4 is a side elevation of the stem shown in Fig. 2.

Fig. 38 is a diagram showing means of driving the rolls from each other, and showing a top roll having cross corrugations, and a bottom roll having circular corrugations or ribs, and a feed roll, the periphery of which is smooth. Both lower rolls are shown as driven from the upper, one from one end and the other from the other end thereof, and a belt tightener movable with the movement of the shafts as shown.

Fig. 39 is a diagram showing independent differential driving means for the rolls. The top roll shaft is driven by a pulley at each end. The feed roll shaft by a larger pulley at one end, and the rear roll shaft by a still larger pulley at its other end, so that all the pulleys are staggered relatively to the top pulley.

Referring to the drawings, let A indicate the bottom shell, B the top shell, C the feed hopper, D the feed chutes, E the slideways, F their caps, G the top stems, H the bottom stems, I the yokes, J the bearing caps, K the top shaft, L the bottom shafts, M the top roll, $M^1$ and $M^2$ the feed and rear rolls, N the ring, O the ring cavity, P the springs, Q the screws, R the top cheek pieces, S the lower cheek pieces, T the regulating gate, U the shut-off gate, V the dust guards, W the pressure springs, X the resistance springs, Y the top screw lock, Y' the bottom screw lock, and Z the stem guards.

One feature of improvement consists in constructing the ring cavity of the shell with a downward enlargement or eccentricity relatively to the center about which the rolls are normally disposed, and in locating the ring so as to bring the lower rolls less than 120° apart from the upper roll, whereby these lower rolls are disposed more than 120° apart from each other, and transmit a major portion of their outward pressure nearer the horizontal than would be the case were the rolls at 120° apart. This relieves the top roll of a material portion of the down-pull of the springs, and thus enables the exertion of a great crushing pressure by the lower rolls without undue compression of the top spring. Freedom for adjustment in this respect is provided, so that the position of the ring can be suited to the pressure or characteristics of the work being done.

For keeping the bearings in alinement radially of the ring, which is of the utmost importance in machines in which rolls are used as the crushing elements, I provide a positive connection between the opposite bearings for each shaft, making it impossible for either bearing to get out of adjustment radially of the ring relatively to the other, or for one to assemble the bearings without bringing them to the proper position. This is preferably accomplished by a lock $a$, which is passed through a diametric hole $b$, drilled through the end of each stem and its adjacent nut $c$. The lock $a$ is shown as a bolt held in place by a nut secured by a cotter pin, but any other positive and separable connection between the bearings may be used. With this the yoke and the two stems form a connection between the opposite ends of each roll, by which the shaft of the latter is carried yieldingly by the spring, and still alinement with the bearings is assured.

Another improvement consists in providing a lock for the adjustment screws Q. I hinge a dog Y (Figs. 12 and 13) on the top yoke, which embraces the head of the screw and prevents movement thereof, which can be swung toward and from position, and is held in place by gravity. For the lower screws I place the dog $Y^1$ (Figs. 15 and 16) over the screws and provide it with bifurcated ends engaging the rib of the yoke, so that it may be raised when adjustment is desired, and will drop into place and lock the screw when released.

As shown I prefer providing a lug $d$ upon the yoke for engaging the shoulder $e$ of the stem, at diametrically opposite sides, and making the Babbitt socket $f$ big enough to extend beyond this shoulder, so that the stem will be axially positioned in the yoke by the lug and still held longitudinally of the yoke by the soft babbitt.

Figure 9:
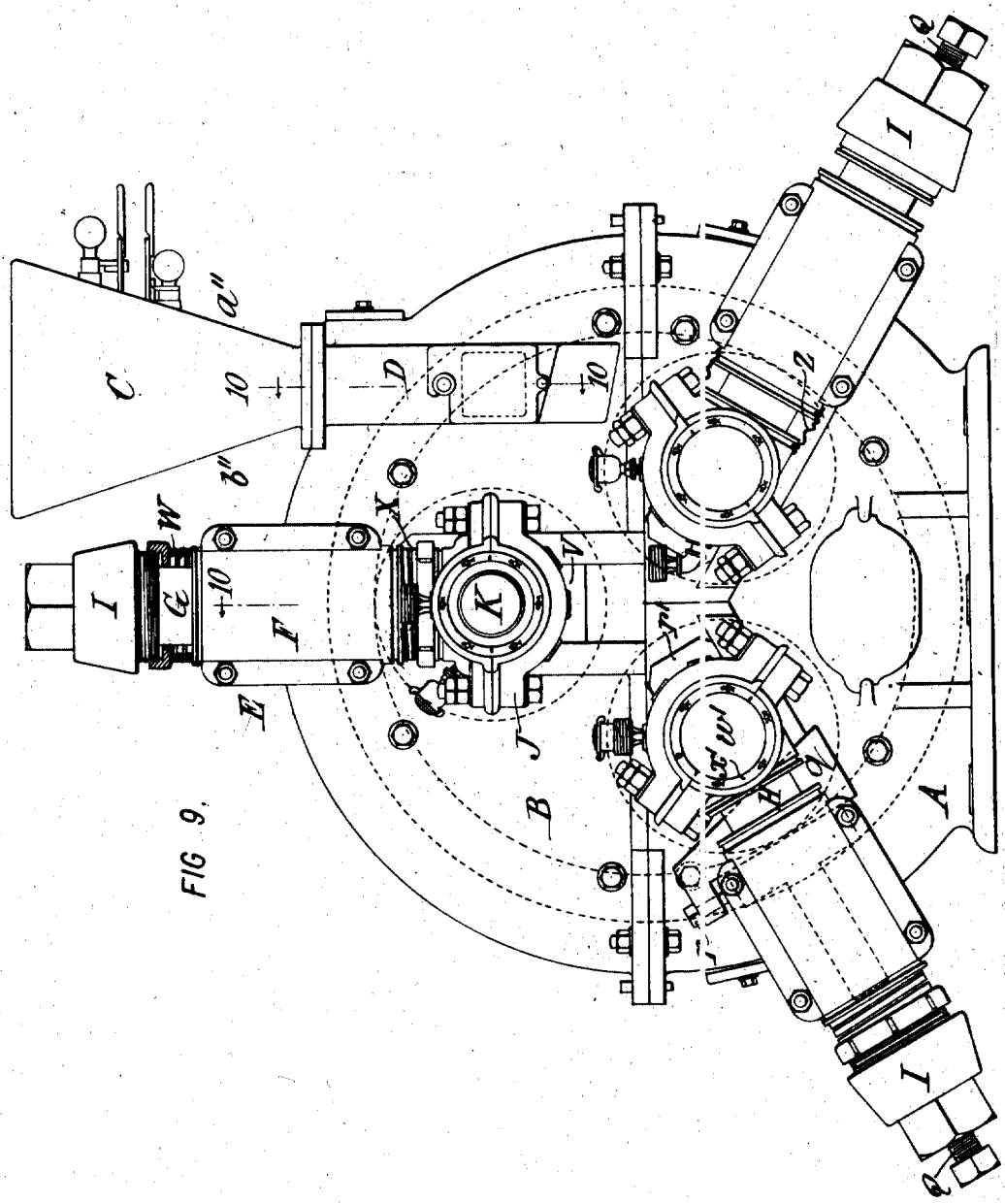
Fig. 9 is a side elevation of the preferred form of my machine.
Figure 10:
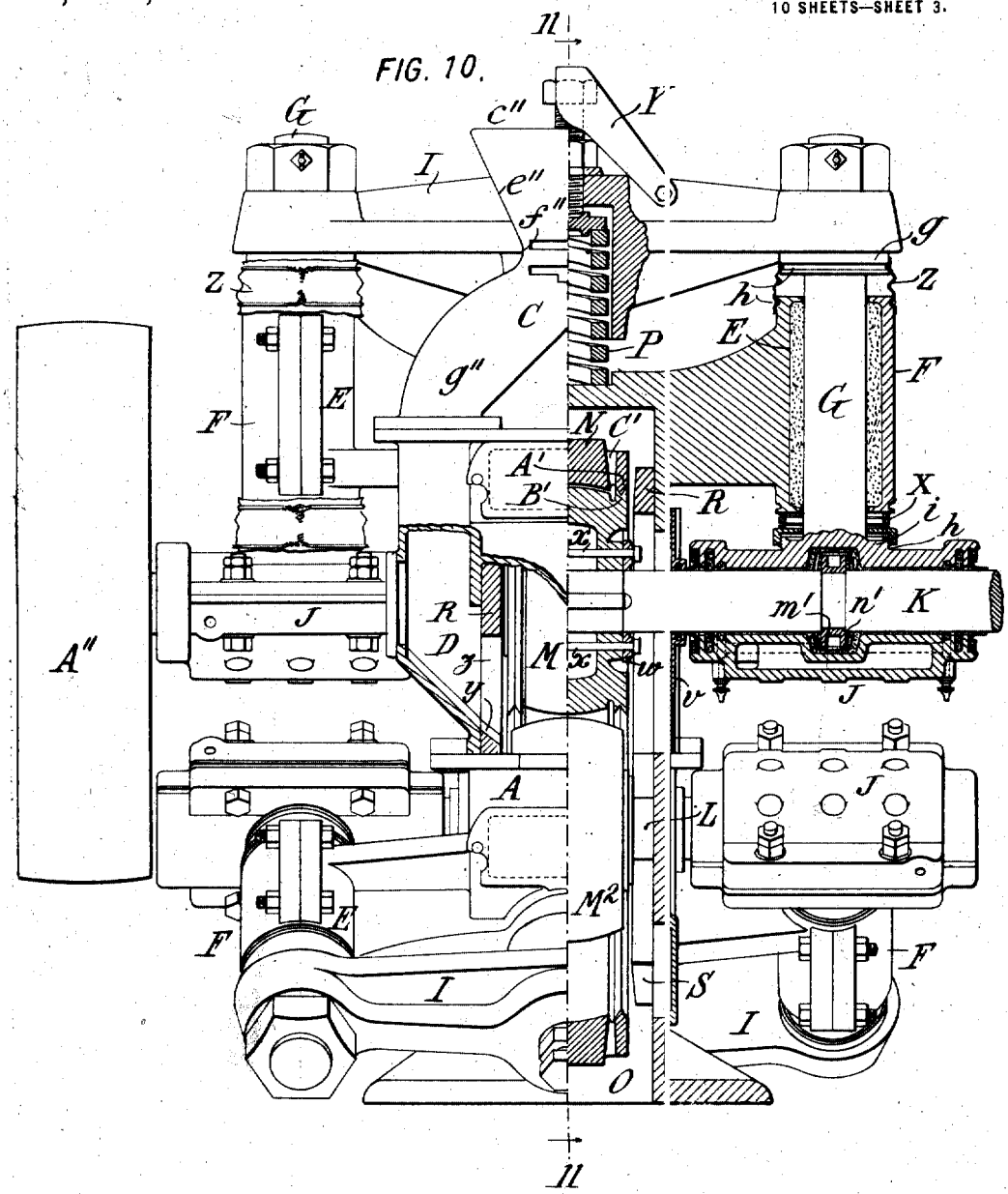
Fig. 10 is a front view thereof, partly in section, on the lines 10—10 of Fig. 9 and looking in the direction of the arrows crossing said lines.

I prefer protecting the slideways from dust and moisture by a flexible guard Z, (Figs. 9 and 10) of canvas or other suitable material, which is connected to the yoke and to the slideway for inclosing the stem between them. I prefer to form the yoke with a boss $g$ at each end, equidistant from its central spring cup and projecting outwardly beyond the adjacent webs of the yoke, and to provide grooves $h$ on this boss and around the adjacent end of the slideway, into which the guard may be wired. At the other end of the slideway, I provide a similar groove, and I provide each bearing stem with a circular boss $i$, (Figs. 10 and 18) also preferably having a groove $h$ for connecting a similar dust guard at this end of the lower stems when desired, as shown in Fig. 10.

Another feature of improvement consists in locating a boss $i$ (Figs. 10 and 18) concentric with the cylindrical portion $j$ at the point where the latter joins the cylindrical head $k$, which boss is preferably provided with a thread $l$, a similar thread $m$ being carried by the other end of the stem, as shown by forming it on the boss $g$ of the yoke. On the threads $l$ and $m$, are screwed nuts $n$, and between these nuts and the adjacent frame or slideway F are placed springs X and W, at one or both ends of the slideways as desired. These springs can be adjusted by the nuts to hold the bearing at any desired distance or position from the slideway, and thus regulate the position of the ring in the shell or of the periphery of the roll relatively to the periphery of the ring, or the springs can be used to prevent vibration of the bearing or to cushion its vibration, or to limit rocking of the bearing frame as a whole. This feature of controlling the shaft of a crushing roll by spring pressure and in both directions, is generally applicable and can be advantageously employed in many machines. With this construction I sometimes use the top screw of the yoke as a mere positive adjusting point, on which the bearing frame is supported, using the springs X and W, or either set of them, as a pressure regulating or resisting medium. A cam $p$ (Fig. 19) may be substituted for the nut $n$, and where no outward yield of the bearing is desired an adjustable member or wedge $q$ adjusted by a screw $r$ may be placed behind the bearing, as shown in Fig. 9.

Another feature of improvement consists in setting the rolls on the shafts. I prefer the form of the shafts with a shoulder $s$ (Fig. 23) coinciding with the face of the roll, and with a key-seat $t$ longer than the width of the roll, and with a key $u$, having end shoulders $v$, coinciding with the face of the roll, and to provide collars $w$ fitting the shaft and passing over the reduced end of the key, until they come against the sides of the roll, where they are held by bolts $x$, see Fig. 10, passing through the collars and the roll, for which purpose the rolls are formed with a plurality of cross holes parallel with their bore, which coincide with corresponding holes in the collars $w$. This makes a durable connection.

Figure 11:
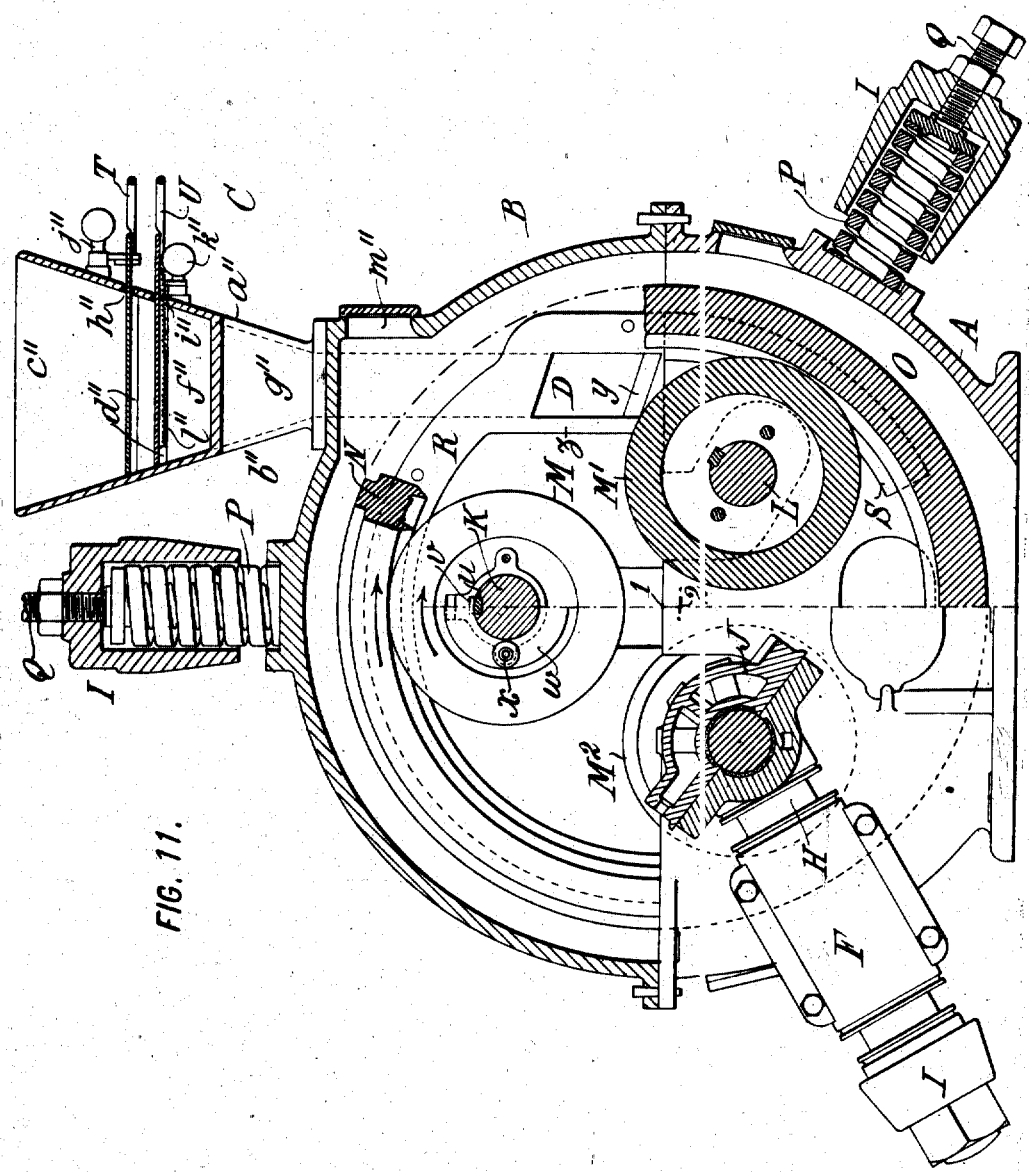
Fig. 11 is a fragmentary side elevation thereof, partly in sections on different planes, and showing some of the parts fragmentarily, being partly cut on the lines 11—11 of Fig. 10 and looking in the direction of the arrow crossing such line.

Another feature of improvement consists in making the cheek ring which protects the casing from contact with the ring N with a bottom wall $y$, preferably beveled beneath the feed spout, and with a side wall $z$ at the inner side thereof, which latter preferably rises and meets the body of the top cheek ring, as shown in Fig. 11. Thus the cheek ring constitutes a continuation of the spout. The walls $z$ may terminate as a hook instead of constituting a complete loop, as shown in Fig. 25.

Another feature of improvement consists in beveling the inner face of the cheek ring (Fig. 10), so that the space between it and the main ring will increase toward the outer periphery of the latter, and this, preferably, is also done to the side faces between the main ring and its auxiliary rings or tracks, as seen in Fig. 10.

An important improvement resides in separating the ring and roll faces from the track faces of the moving parts, as shown in Figs. 10, 34 and 35. Preferably a separate inclined track A' is fastened on the ring N, and an oppositely inclined adjustable track B' is fastened on the roll or shaft. By adjusting either track in or out, the space between the working faces of the roll and ring can be varied, and the traction faces relieved of the wear of the crushing faces. Any means of carrying either or both these tracks may be used, both may be formed integrally with their adjusting part, as shown in Fig. 10, or separately, and adjustable relatively thereto, as shown in Fig. 34. The adjustment shown consists of screws $a'$, screwed through the track A' and against the ring N for pressing the track out, and screws $b'$ passing through the track A' and screwing into the ring for holding the track in. Screws $c'$ and $d'$ are provided on one or more of the rolls for the same purpose. By this arrangement any desired limit of distance can be preserved between the ring and rolls, or one or more of them, limiting the fineness to which crushing, granulating, or pulverizing shall be effected. When integral, the tracks are perfectly V-shaped, a V-groove being formed on the roll, and a V-edge on the ring, and flaring spaces C' being formed between the track and ring body while casting the latter. The product can escape through these spaces, and will not collect in the groove, and cannot stay on the track.

Figure 3:
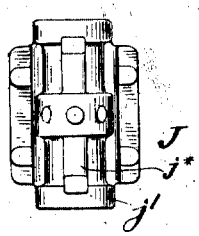
Fig. 3 is an outer face view of one bearing cap.
Figure 5:
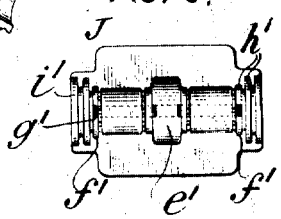
Fig. 5 is an inner face view of one bearing.
Figure 6:
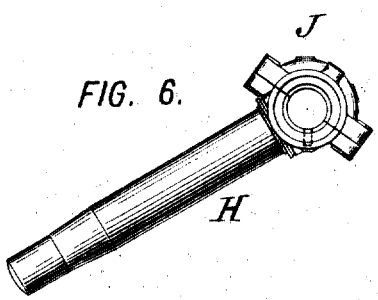
Fig. 6 is a side elevation of another bearing stem and another cap.
Figure 7:
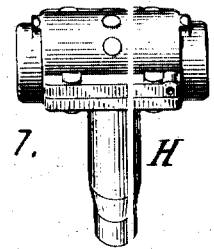
Fig. 7 is a side elevation thereof.
Figure 8:
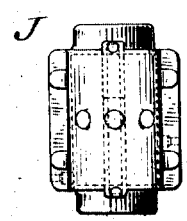
Fig. 8 is an outer face view of another bearing cap.

As shown I prefer to form the lower side of each bearing with a central oil well $e'$, Fig. 5, end oil grooves $f'$, and a communicating conduit $g'$, and with a sediment pocket at each end, and with an inclined face so that the edge of the bearing is high enough to retain the oil, and the division between the bearing and cap is oblique relatively to the cylindrical stem. I also provide each bearing with a plurality of grooves and packing recesses $h'$, and with a pocket $i'$ at one or both ends. When the bearings are not water jacketed, they have exterior cavities between the central oil well and the enlarged ends $j'$, in which the grooves are located, and they have a longitudinal rib $j^*$ Fig. 3 covering the oil duct. When they are water jacketed, as shown in Figs. 10 and 29, a central rib k* divides the jacket nearly to one end of the cap, where a cross duct l* communicates between the opposite sides, and at the other end the inlet and outlet openings k' are disposed at opposite sides for the bored holes, so that they are staggered, as seen in Fig. 30. The water jackets are traversed by ties l' at different angles, through which holes may be bored to babbitt the caps at any angle or to introduce oil at the point in the cap where bearing pressure begins. Each cap provides for longitudinal movement of the shaft, for which the oil well may be used, which is cast wider than the collar m' and set in a groove on the shaft and guarded from the babbitt by loose rings n' between which and the babbitt there is the desired clearance or end thrust. Phoenix packing may be put in the grooves h' and cut leather and felt may be put in the pockets i'. Each cap has a lip or flange projecting over the stem so that material running down the inclined edge of the flanges cannot enter the joint.

The dust guard V (see Figs. 26 to 28) consists of a plate p' fastened to the side of the casing over the shaft slot by studs q', a sliding plate r' having an integral box s' which carries a ring of packing material supporting the plate from the shaft with an air tight joint. A packing recess t' is provided at the upper side of the box. Side guides u' prevent side motion of the plate r', and straps v' overhang the sliding plate and keep it against the stationary plate p'. The latter and the guide ways and straps are held in place by studs riveted to the shell. The corners of the plate may be beveled to permit it to slide on the lower bearings as shown in Fig. 9.

The outer ends of the lower bearings are closed by a solid disk w' held in the bearing (see Fig. 9) by partially split rings x' which are fastened by studs to the cap and stem.

The feed hopper has front and rear inclined walls a'', b'', a wide top c'', inclining side walls e'', a narrow throat f'', and bifurcated discharge ends g'', and has internal ribs d'' and openings through its front wall at h'' i'' through which the doors T and U pass. A lock j'' engages the side of the door T, which has square notches into which the lock passes so that the lock must be held open with one hand while the gate is adjusted, thus rendering impossible accidental movement of this gate. A lock k'' engages the rack l'' on the underside of the gate U, the teeth of the rack being beveled, and the tooth of the lock being similarly beveled so that the gate can be closed easily by using force, but cannot be opened without disengaging the lock.

The top shell is formed with a hand hole m'' at its front side between the chutes D, which is the side toward which the top of the ring moves in revolving. Thus by inserting a rod into this hand hole any nail which may be driven between the ring and cheek ring can be driven outwardly toward the direction from which it entered.

Each shell (Figs. 20 and 21) is constructed with a half round slide way the cap of which is removable, so that any stem can be removed sidewise from the machine. The slide way has flanges n'' at each side, reduced ends p'', grooves q'' therein, and a central Babbitt cavity r''. The flanges n'' have bolt notches s'' with washer sockets t'' at their rear sides so that the bolts can be passed through the notches and the washers thereon dropped into the sockets, which will prevent the bolts from falling out when tight. A lug or shoulder u'' near the socket engages the head of the bolt and prevents its turning.

Each guide way is held by a tapering web v'' and a curved web w'', the latter crossing the end of the body and having a central circular portion constituting the spring pocket. The webs v'' and w'' have a T-shape in cross-section. Each slot in the body is surrounded by a strip z'' having rounded or beveled edges.

What I claim is:—

1. The combination with a revoluble ring, of three rolls coacting with the inner face thereof and disposed the one near the upper part of and supporting said ring, and the others below the center of the ring, a casing inclosing said parts, bearings for carrying said rolls radially of a predetermined center relatively to said casing, said casing having a ring cavity eccentric of said center at its lower side, said ring disposed eccentrically relatively to and with its center below said center, and said lower rolls disposed with their points of action against the inner periphery of the ring more than 120 degrees apart.

2. The combination with a revoluble ring, of three rolls coacting with the inner face thereof and disposed the one near the upper part of and supporting said ring, and the others below the center of the ring, a casing inclosing said parts, bearings for carrying said rolls radially of a predetermined center relatively to said casing, said casing having a ring cavity eccentric of said center at its lower side, said ring disposed eccentrically relatively to and with its center below said center, and said lower rolls disposed with their points of action against the inner periphery of the ring more than 120 degrees apart, and means for relatively adjusting said ring and rolls.

3. The combination with a revoluble ring, of three rolls coacting with the inner face thereof and disposed the one near the upper part of and supporting said ring, and the others below the center of the ring, a casing inclosing said parts, bearings for carrying said rolls radially of a predetermined center relatively to said casing, said casing having a ring cavity eccentric of said center at its lower side, said ring disposed eccentrically relatively to and with its center below said center, and said lower rolls disposed with their points of action against the inner periphery of the ring more than 120 degrees apart, and a spring supporting said top roll.

4. The combination with a revoluble ring, of three rolls coacting with the inner face thereof and disposed the one near the upper part of and supporting said ring, and the others below the center of the ring, a casing inclosing said parts, bearings for carrying said rolls radially of a predetermined center relatively to said casing, said casing having a ring cavity eccentric of said center at its lower side, said ring disposed eccentrically relatively to and with its center below said center, and said lower rolls disposed with their points of action against the inner periphery of the ring more than 120 degrees apart, and means pressing said lower rolls outwardly independent of the weight of said ring.

5. The combination with a revoluble crushing ring, three rotatable crushing rolls within and eccentric of said ring, means for driving said parts, and a casing for said parts, of means supporting said rolls radially of a predetermined center relatively to said ring, means supporting said ring eccentrically relatively to and with its center below said center, one of said rolls disposed near the upper part of said ring, and the other rolls disposed below it with their points of action against the inner periphery of said ring more than 120 degrees apart, and movable means for pressing said lower rolls apart to generate a crushing pressure toward the inner face of said ring, whereby a part of such pressure is consumed within the ring independently of said supporting means.

6. In combination, an annular crushing die revolving in an approximately vertical plane and having an internal crushing face, a movable and rotatable crushing roll within and eccentric to said die and having a peripheral crushing face reciprocal to the internal face of the latter, means for revolving one of said parts, a movable non-rotative carrier on which said roll is rotatably mounted, means supporting said parts, a spring acting to press said roll outwardly toward the inner face of said die to resist a crushing pressure therefrom, and a spring or springs acting on said carrier to neutralize the effect of gravity on said roll.

7. In combination, an annular crushing die revolving in an approximately vertical plane and having an internal crushing face, two or more rotatable crushing rolls movable toward and from one another within and eccentric to said die and each having a peripheral crushing face reciprocal to the internal face of the latter, means for revolving one of said parts, non-rotative carriers movable toward and from one another on which said rolls are rotatably mounted respectively, means pressing said carriers outwardly away from one another to resist a crushing pressure from the inner face of said die, and means for holding said rolls inwardly toward one another and away from the inner face of said die to retire them from said die.

8. In combination, an annular crushing die revolving in an approximately vertical plane and having an internal crushing face, a movable and rotatable crushing roll within and eccentric to said die and having a crushing face reciprocal to that of the latter, means for revolving one of said parts, a movable non-rotative carrier on which said roll is rotatably mounted, a spring pressing said carrier outwardly for pressing said roll outwardly toward the inner face of said die to resist a crushing pressure therefrom, and a second spring acting against said carrier for pressing it inwardly and opposing said first mentioned spring to yieldingly position said carrier.

9. In combination, a revolving annular foraminous or open-work crushing die having an internal crushing face on which material is held by centrifugal force and having outwardly tapered or flaring apertures or spaces extending from such face through its body intermediate of its sides, a movable and rotatable crushing roll within and eccentric to said die and having an external crushing face reciprocal to the crushing face of said die, means for revolving one of said parts, movable non-rotative means on which said roll is rotatably mounted, and means for holding said roll toward said die to resist a crushing pressure from the inner face of the latter.

10. In combination, a revolving annular crushing die having an internal crushing face and an additional internal annular face, a rotatable crushing roll within and eccentric to said die and having an external crushing face reciprocal to the crushing face of said die and an additional external annular face opposed to said additional face of said die, one of said parts movable toward and from the other of said parts, means for revolving one of said parts, and non-rotative means on which said roll is rotatably mounted, said additional faces of said die and roll reciprocal to each other and determining the proximity of the crushing faces of said parts.

11. A crushing roll, a shaft therefor, a movable support for said shaft, a spring for maintaining said support in position, and a screw for adjusting said spring, in combination with an automatic lock for said screw.

12. In combination a revolving annular die having a plurality of separate annular internal faces, a crushing roll within and supporting said die acting against one of said faces, and means for revolving said die acting against another of said faces.

13. In combination, a revolving annular crushing die having an internal crushing face and an additional internal annular face, a plurality of rotatable crushing rolls within said die and each having an external crushing face reciprocal to the crushing face of said die and an additional external annular face reciprocal to said additional face of said die, means for revolving one of said parts, and means for holding said rolls apart to resist a crushing pressure from the inner face of said die.

14. A shell having a feed chute, and revolving crushing parts within said shell for receiving the feed discharged through said chute, in combination with a cheek-piece within said shell between its wall and said parts for preventing the latter from striking such wall, said cheek-piece having a recess opposite said chute for permitting flow from said chute to pass through said cheek-piece to said parts.

15. A shell having a feed chute, revoluble crushing parts within said shell for receiving the feed discharged through said chute, and a cheek-piece within said shell between its wall and said parts for protecting such wall from contact with said parts, said cheek-piece open opposite said chute, and having a wall at one side of, and having a wall crossing the bottom of, said chute.

16. A shell having a feed chute, revoluble crushing parts within said shell for receiving the feed discharged through said chute, and an apertured cheek-piece within said shell between its wall and said parts for preventing the latter from striking such wall, said cheek-piece having walls at the opposite sides and across the bottom of said chute.

17. A shell having a feed chute, revoluble crushing parts within said shell for receiving the feed discharged through said chute, and a cheek-piece within said shell between its wall and said parts for protecting the former, and having an aperture opposite said chute and a loop surrounding said chute.

18. A shell having a feed chute, revoluble crushing parts within said shell for receiving the feed discharged through said chute, and a cheek-piece open opposite said chute and having an inclined wall crossing the bottom of said chute, said cheek-piece guarding said shell from wear.

19. The combination with two revolving crushing members, one carrying the other, of means concentric with one of said parts for driving the one from the other by traction independently of their adjacent crushing faces, substantially as described.

20. The combination with two revolving crushing parts, one supporting the other, of means concentric with one of said parts connected to and moving with said parts respectively for spacing their crushing faces apart from each other.

21. The combination with two revolving crushing parts, one a roll within and supporting the other, of adjustable means carried by said parts respectively for spacing their crushing faces apart from each other.

22. The combination with two revolving crushing parts, one supporting the other, of tracks on the one and reciprocal tracks on the other, one of said parts having discharge apertures between its crushing face and said tracks.

23. The combination with two revolving crushing parts of a convex track on the one and a concave track on the other remote from and concentric with their adjacent crushing faces.

24. The combination with a revolving annular die having a plurality of annular faces, of a crushing roll having a reciprocal face in operative relation to each of said faces and within and supporting the die.

25. The combination with a revolving die and a roll, of a shell for said parts, a cheek-piece between said parts and said shell for protecting the latter, said parts and said piece constructed on their adjacent faces to form between them a space increasing in width toward the outer periphery of said die.

26. A crushing roll and a shell, in combination with a revolving die having a beveled side face surrounding said roll and supported thereby in addition to its crushing face.

27. The combination with a revolving die and a crushing roll having a shaft projecting at opposite sides, and a shell inclosing said die and roll, of bearings for said shaft at opposite sides, a spring reacting against said shell for drawing said bearings in an outward direction, and an adjustable stop for limiting the outward movement of said bearings.

28. The combination with a revolving die, of a crushing roll, a shaft projecting at opposite sides thereof, a shell inclosing said roll, bearings for said shaft outside of said shell, a spring for drawing said bearings in an outward direction reacting against said shell, and a second spring between said bearings and said first spring for pressing said bearings in the opposite direction.

29. A revolving die in combination with a crushing roll, a shaft therefor projecting at opposite sides thereof, a bearing for each end of said shaft, a cylindrical sliding portion connected to each bearing, a guide for such portion, such portion carrying screw threads at opposite ends of said guide, nuts engaging said threads, and springs reacting against said guide and said nuts.

30. A revolving die, and a roll therein, in combination with a bearing frame, a spring central thereof for pressing it in one direction, springs at opposite sides of said frame and between said central spring and the bearing for pressing it in the other direction, a shaft carried by said bearings, and a roll carried by said shaft.

31. A revolving annular die and a plurality of rolls within and yieldingly pressing against its inner face, one of said rolls supporting said die, in combination with means for driving each of said rolls at a different surface speed from each of the others at the same time.

32. A revolving die, and rolls yieldingly pressing against its inner face, and means for revolving said rolls, said rolls having differential peripheries, one grooved in one direction and the other grooved in the opposite direction, and a roll within and supporting said die.

33. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a movable non-rotative member on which said roll is rotatably mounted, means supporting said parts, a spring acting on said member to press said roll outwardly toward the inner face of said die to resist a crushing pressure from the latter, and a spring acting on said member to oppose outward movement of said roll.

34. In combination, an annular crushing die revolving in an approximately vertical plane and having an internal crushing face, a movable and rotatable crushing roll within and eccentric of said die and having a peripheral crushing face reciprocal to the internal face of said die, means for revolving one of said parts, a movable non-rotative member on which said roll is rotatably mounted, means for supporting said parts, pressing means acting to press said roll outwardly toward the inner face of said die to resist a crushing pressure therefrom, and pressing means acting to press said roll inwardly of the inner face of said die.

35. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a movable non-rotative member on which said roll is rotatably mounted, means supporting said parts, pressing means acting to press said roll downwardly toward the inner face of said die to resist a crushing pressure therefrom, and yielding means acting to hold said roll upwardly.

36. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a movable non-rotative member on which said roll is rotatably mounted, means for supporting said parts, and means for holding said roll relatively of the inner face of said die comprising a spring acting to press said roll upwardly and a spring acting to press said roll downwardly.

37. In combination, an annular crushing die revolving in an approximately vertical plane and having an internal crushing face, two rotatable crushing rolls one movable toward and from the other within and eccentric of said die and each having a peripheral crushing face reciprocal to the internal face of said die, means for revolving one of said parts, a non-rotative movable member on which said movable roll is rotatably mounted, means for supporting said parts, a spring acting to press said movable roll toward said other roll, and means holding said rolls apart.

38. In combination, an annular crushing die revolving in an approximately vertical plane and having an internal crushing face, two rotatable crushing rolls movable toward and from each other within and eccentric of said die and each having a peripheral crushing face reciprocal to the internal face of said die, means for revolving one of said parts, movable non-rotative members on which said rolls are rotatably mounted respectively, means for supporting said parts, a spring acting to press said rolls away from one another to resist a crushing pressure from the inner face of said die, and a spring acting to press said rolls toward one another.

39. In combination, an annular crushing die revolving in an approximately vertical plane and having an internal crushing face, three rotatable crushing rolls within and eccentric of said die and each having a peripheral crushing face reciprocal to the internal face of the latter, means for revolving one of said parts, a movable non-rotative member on which one of said rolls is rotatably mounted, means for supporting said parts, means acting on said non-rotative member for pressing its roll outwardly away from the other of said rolls for resisting a crushing pressure from the inner face of said die, and a spring acting on said non-rotative member for pressing its roll inwardly.

40. In combination, an annular crushing die revolving in an approximately vertical plane and having an internal crushing face, a plurality of rotatable crushing rolls movable toward and from each other within and eccentric of said die and each having a peripheral crushing face reciprocal to the internal face of the latter, means for revolving one of said parts, movable non-rotative members on which said movable rolls are rotatably mounted respectively, means for supporting said parts, pressing means acting to press said movable rolls outwardly away from one another toward the inner face of said die to resist a crushing pressure from the latter, and means for moving said movable rolls inwardly toward one another away from the inner face of said die.

41. In combination, an annular crushing die revolving in an approximately vertical plane and having an internal crushing face, three rotatable crushing rolls movable toward and from each other within and eccentric of said die and each having a peripheral crushing face reciprocal to the internal face of said die, means for revolving one of said parts, movable non-rotative members on which said rolls are rotatably mounted respectively, means supporting said parts, a spring or springs acting to press said rolls away from one another to resist a crushing pressure from the inner face of said die, and means acting to move said rolls toward one another away from the inner face of said die.

42. In combination, an annular crushing die revolving in an approximately vertical plane and having an internal crushing face, a rotatable crushing roll within and eccentric of said die and having a peripheral crushing face reciprocal to the internal face of said die, means for revolving one of said parts, a movable non-rotative carrier on which said roll is rotatably mounted, means for supporting said parts, and a spring disposed at the side of said die and outwardly of the axis of said roll acting on said non-rotative carrier to press said roll upwardly toward the inner face of said die to resist a crushing pressure from the latter.

43. In combination, an annular crushing die revolving in an approximately vertical plane and having an internal crushing face, a rotatable crushing roll within and eccentric of said die and having an external crushing face reciprocal to the internal face of said die, means for revolving one of said parts, movable non-rotative means on which said roll is rotatably mounted comprising an outwardly projecting tension member, means for supporting said parts, and a spring at the side of said die disposed outwardly of the axis of said roll and acting on said tension member to hold said roll upwardly to press said roll toward the inner face of said die to resist a crushing pressure from the inner face of the latter.

44. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a movable non-rotative member having a bearing portion on which said roll is rotatably mounted, means for supporting said parts, and a spring disposed opposite the bearing portion of said member and acting on said member to press said roll upwardly toward the inner face of said die to resist a crushing pressure of the latter.

45. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a casing affording a crushing chamber for said parts comprising a side or wall having an aperture at the side of said roll, an axle or stud traversing said aperture and movable radially and axially of said die and on which said roll is mounted, movable non-rotative means movably mounted at the side of said casing and carrying said axle or stud, pressing means acting on said movable means for pressing said roll outwardly toward the inner face of said die to resist a crushing pressure from the latter, closing means for said aperture mounted on said axle or stud and movable radially of said die, and holding means resisting movement of said closing means axially of said axle or stud.

46. In combination, an annular crushing die revolving in an approximately vertical plane and having an internal crushing face, a rotatable and axially movable crushing roll within and eccentric of said die and having a peripheral crushing face reciprocal to the internal face of the latter, means for revolving one of said parts, a casing affording a crushing chamber for said parts comprising a side or wall having an aperture at the side of said roll, a rotatable axle or shaft on which said roll is mounted extending through said aperture, a non-rotative member opposite said aperture spaced apart from and outwardly of the side or wall of said casing opposite said aperture and on which said axle or stud is rotatably mounted, a closing plate or member for said aperture movably mounted on said axle or stud, and means resisting movement of said plate or member axially of said axle or stud.

47. In combination, an annular crushing die revolving in an approximately vertical plane and having an internal crushing face, two rotatable crushing rolls movable toward and from each other within and eccentric of said die and each having a peripheral crushing face reciprocal to the internal face of the latter, means for revolving one of said parts, a casing affording a crushing chamber for said parts comprising a side or wall having apertures at the side of said rolls respectively, movable non-rotative means at the side of and spaced apart from the side or wall of said casing opposite said apertures respectively, pressing means acting on said non-rotative means for pressing said rolls away from one another toward the inner face of said die to resist a crushing pressure from the latter, closing means for said apertures respectively movable radially of said die and disposed intermediate of said non-rotative means and the adjacent side of said die, movably sustained by and moving with said non-rotative means respectively, and means for resisting movement of said closing means axially of said die.

48. In combination, an annular crushing die revolving in an approximately vertical plane and having an internal crushing face, three rotatable crushing rolls movable toward and from each other within and eccentric of said die and each having a peripheral crushing face reciprocal to the internal face of said die, means for revolving one of said parts, a casing affording a crushing chamber for said parts comprising a wall or side having apertures at the side of said rolls respectively, non-rotative members on which said rolls are rotatably mounted respectively, pressing means acting on said non-rotative members to press said movable rolls outwardly away from one another to resist a crushing pressure from the inner face of said die, closing means for said apertures respectively movable radially of said die disposed inwardly of and spaced apart from said non-rotative means, and means for resisting movement of said closing means axially of said die.

49. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a frame or casing supporting said parts and affording a crushing chamber for said parts and comprising a side or wall at the side of said die and a support at the side of and spaced apart from said side or wall, a movable non-rotative member mounted on said support at the side of said casing and on which said roll is rotatably mounted, and a spring disposed at the side of said die above said non-rotative member and acting on the latter to press said roll upwardly toward the inner face of said die to resist a crushing pressure therefrom and reacting against said support.

50. In combination, an annular crushing die revolving in an approximately vertical plane and having an internal crushing face, a movable and rotatable crushing roll within and eccentric of said die and having a peripheral crushing face reciprocal to the internal face of the latter, means for revolving one of said parts, a frame or casing affording a crushing chamber for said parts comprising a side or wall at the side of said die and a way or support outwardly of and spaced apart from said side or wall, a non-rotative member slidingly mounted at the side of said die on said way or support and on which said roll is rotatably mounted, and a spring at the side of said die above said way or support acting on said non-rotative member to press said roll upwardly toward the inner face of said die to resist a crushing pressure from the latter.

51. In combination, an annular crushing die revolving in an approximately vertical plane and having an internal crushing face, three rotatable crushing rolls two movable toward and from each other within and eccentric of said die and each having a peripheral crushing face reciprocal to the internal face of said die, means for revolving one of said parts, a frame or casing affording a crushing chamber for said parts and comprising a side or wall at the side of said die and supports at the side of said die spaced outwardly from said side or wall, non-rotative movable members mounted on said supports and on which said movable rolls are rotatably mounted respectively, and springs mounted on said supports and acting on said non-rotative members for pressing said movable rolls outwardly away from one another toward the inner face of said die to resist a crushing pressure from the latter.

52. In combination, an annular crushing die revolving in an approximately vertical plane and having an internal crushing face, a rotatable crushing roll within and eccentric of said die and having a peripheral crushing face reciprocal to the internal face of said die, means for revolving one of said parts, a frame or casing affording a support at each side of said die, non-rotative members disposed at the sides of said die and on which said roll is rotatably mounted on said supports respectively, and springs disposed at each side of said die respectively acting on said non-rotative members respectively for pressing said roll upwardly toward the inner face of said die to resist a crushing pressure from the latter.

53. In combination, an annular crushing die revolving in an approximately vertical plane and having an internal crushing face, two rotatable crushing rolls movable toward and from each other within and eccentric of said die and each having a peripheral crushing face reciprocal to the inner face of the latter, means affording supports at the opposite sides of said die, non-rotative members disposed at the opposite sides of said die and on which said rolls are rotatably mounted respectively, and springs disposed at the opposite sides of said die and acting to press said non-rotative members downwardly away from one another to resist a crushing pressure from the inner face of said die.

54. In combination, an annular crushing die revolving in an approximately vertical plane and having an internal crushing face, a rotatable crushing roll within and eccentric of said die, a second rotatable crushing roll movable toward and from said first roll within and eccentric of said die, said rolls each having a peripheral crushing face reciprocal to the internal face of said die, means for revolving one of said parts, non-rotative means on which said first roll is rotatably mounted, means for supporting said parts comprising a fixed support at each side of said die, movable non-rotative means at each side of said die mounted on said fixed supports respectively, and pressing means at each side of said die acting on said movable non-rotative means to press said movable roll outwardly away from the other roll to generate a crushing pressure toward the inner face of said die.

55. In combination, an annular crushing die revolving in an approximately vertical plane and having an internal crushing face, two rotatable crushing rolls movable toward and from each other within and eccentric of said die and each having a peripheral crushing face reciprocal to the internal face of the latter, means for revolving one of said parts, non-rotative means movable toward and from each other on which said rolls are rotatably mounted respectively, springs disposed at each side of said die acting on said non-rotative means for pressing said rolls outwardly and downwardy away from one another to resist a crushing pressure from the inner face of said die, and means for supporting said parts.

56. In combination, an annular crushing die revolving in an approximately vertical plane and having an internal crushing face, three rotatable crushing rolls within and eccentric of said die and each having a peripheral crushing face reciprocal to the internal face of the latter, two of said rolls movable toward and from each other, means for revolving one of said parts, non-rotative means on which one of said rolls is mounted, movable non-rotative means on which said movable rolls are rotatably mounted respectively, means for supporting said parts, and pressing means on each side of said die acting on said movable non-rotative means to press said movable rolls outwardly away from one another to resist a crushing pressure from the inner face of said die.

57. In combination, an annular crushing die revolving in an approximately vertical plane and having an internal crushing face, two rotatable crushing rolls movable toward and from each other within and eccentric of said die and each having a peripheral crushing face reciprocal to the internal face of said die, means for revolving one of said parts, non-rotative movable means on which said rolls are rotatably mounted respectively, and pressing means comprising reversely inclined springs disposed at each side of said die and acting on said non-rotative means respectively to press said rolls outwardly away from one another to resist a crushing pressure from the inner face of said die.

58. In combination, an annular crushing die revolving in an approximately vertical plane and having an internal crushing face, three rotatable crushing rolls within and eccentric of said die and each having a peripheral crushing face reciprocal to the inner face of said die, two of said rolls movable toward and from each other, means for revolving one of said parts, non-rotative means on which one of said rolls is mounted, movable non-rotative means on which said movable rolls are mounted respectively, and divergently acting yielding pressing means disposed at the side of said die and acting on said movable non-rotative means for pressing said movable rolls outwardly away from one another toward the inner face of said die to resist a crushing pressure therefrom.

In witness whereof, I have hereunto signed my name in the presence of two subscribing witnesses.

GEORGE H. FRASER.

Witnesses:
FRED WHITE,
THOMAS F. WALLACE.